US012763403B2

(12) United States Patent
Nakano

(10) Patent No.: US 12,763,403 B2
(45) Date of Patent: Oct. 13, 2026

(54) WARMUP DEVICE OF VEHICULAR STORAGE BATTERY

(71) Applicant: TOYOTA JIDOSHA KABUSHIKI KAISHA, Toyota (JP)

(72) Inventor: Taiki Nakano, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 4 days.

(21) Appl. No.: 18/433,718

(22) Filed: Feb. 6, 2024

(65) Prior Publication Data

US 2024/0283056 A1 Aug. 22, 2024

(30) Foreign Application Priority Data

Feb. 22, 2023 (JP) ................................. 2023-026760

(51) Int. Cl.

| | |
|---|---|
| ***H01M 10/667*** | (2014.01) |
| ***H01M 10/617*** | (2014.01) |
| ***H01M 10/625*** | (2014.01) |
| ***H01M 10/6568*** | (2014.01) |

(52) U.S. Cl.

CPC ....... *H01M 10/667* (2015.04); *H01M 10/617* (2015.04); *H01M 10/625* (2015.04); *H01M 10/6568* (2015.04); *H01M 2220/20* (2013.01)

(58) Field of Classification Search

None

See application file for complete search history.

(56) References Cited

U.S. PATENT DOCUMENTS

| | | | | |
|---|---|---|---|---|
| 6,323,613 | B1 | 11/2001 | Hara et al. | |
| 2010/0050676 | A1 | 3/2010 | Takamatsu et al. | |
| 2015/0101789 | A1 * | 4/2015 | Enomoto | B60H 1/039 236/35 |
| 2020/0171913 | A1 * | 6/2020 | Kim | H01M 10/625 |
| 2020/0212520 | A1 * | 7/2020 | Dan | H01M 10/48 |
| 2020/0214088 | A1 * | 7/2020 | Sugimoto | H03K 17/04126 |
| 2022/0032732 | A1 * | 2/2022 | Makihara | F25B 5/02 |
| 2023/0163378 | A1 * | 5/2023 | Wang | H01M 10/425 318/139 |
| 2025/0162461 | A1 * | 5/2025 | El-Barbari | B60L 1/02 |

FOREIGN PATENT DOCUMENTS

| | | | |
|---|---|---|---|
| JP | 2001-238406 | A | 8/2001 |
| JP | 2007-028702 | A | 2/2007 |
| JP | 2008-189249 | A | 8/2008 |
| JP | 2010-259217 | A | 11/2010 |
| JP | 2012-178930 | A | 9/2012 |
| JP | 2020-162272 | A | 10/2020 |

* cited by examiner

*Primary Examiner* — Regis J Betsch
*Assistant Examiner* — Joel Barnett
(74) *Attorney, Agent, or Firm* — Oliff PLC

(57) ABSTRACT

At least one inverter is heated by causing an inverter heat generation control unit to pass a predetermined current through the inverter for a predetermined time, and heating of the at least one inverter causes a high-voltage battery (storage battery) to warm up via a cooling circuit. Accordingly, control for warmup of the high-voltage battery (storage battery) is simply performed by passing the predetermined current through the inverter for a predetermined time. This inverter heat generation control can also be applied to a vehicle not including a step-up converter.

8 Claims, 5 Drawing Sheets

WARMUP DEVICE OF VEHICULAR STORAGE BATTERY

CROSS-REFERENCE TO RELATED APPLICATION

This application claims priority to Japanese Patent Application No. 2023-026760 filed on Feb. 22, 2023 incorporated herein by reference in its entirety.

BACKGROUND

1. Technical Field

The invention relates to a warmup device of a vehicular storage battery that warms up a storage battery in a vehicle in which a drive current from the storage battery is supplied to an electric motor via an inverter.

2. Description of Related Art

In a vehicle including an inverter that controls a drive current from a storage battery which is supplied to an electric motor and a step-up converter that steps up a voltage of the storage battery through switching control of a switching element and outputs the stepped-up voltage to the inverter, a vehicle driving device that warms up the storage battery through self-heating of the storage battery by performing ripple temperature increase control for increasing a ripple current by decreasing a switching frequency of the step-up converter and thus increasing heating in an internal resistor of the storage battery has been proposed. An example thereof is a vehicle driving device described in Japanese Unexamined Patent Application Publication No. 2010-259217 (JP 2010-259217 A).

SUMMARY

A chargeable/dischargeable electric power range of a storage battery is narrowed at low temperatures. Accordingly, it is preferable to perform warmup in order to broaden the chargeable/dischargeable electric power range. However, a storage battery with a narrow chargeable/dischargeable electric power range has to be caused to perform self-heating at low temperatures, a switching frequency of a step-up converter for increasing a ripple current required for generation of heat from an internal resistor of the storage battery is calculated based on a detected temperature from a temperature sensor detecting a temperature of the storage battery, and thus there is a problem in that control becomes complicated. This technique cannot be applied to a vehicle not including a step-up converter and thus there is also a problem in that applicable vehicles are limited.

The invention provides a control device for a vehicular storage battery that can simplify warmup control for warmup of a storage battery and be applicable to a vehicle not including a step-up converter.

According to an aspect of the invention, there is provided a control device for a vehicular storage battery including: an inverter configured to control a drive current supplied from a storage battery to an electric motor; a cooling circuit configured to cool the storage battery and the inverter by circulating a refrigerant; and an inverter heat generation control unit configured to cause the inverter to emit heat by passing a predetermined current through the inverter for a predetermined time and to cause the storage battery to warm up via the cooling circuit.

According to the aspect of the invention, the inverter is heated by causing an inverter heat generation control unit to pass a predetermined current through the inverter, and heating of the inverter causes the storage battery to warm up via the cooling circuit. Accordingly, control for warmup of the storage battery is simply performed by passing the predetermined current through the inverter. This inverter heat generation control can also be applied to a vehicle not including a step-up converter.

BRIEF DESCRIPTION OF THE DRAWINGS

Features, advantages, and technical and industrial significance of exemplary embodiments of the invention will be described below with reference to the accompanying drawings, in which like signs denote like elements, and wherein.

DETAILED DESCRIPTION OF EMBODIMENTS

Hereinafter, an embodiment of the invention will be described in detail with reference to the accompanying drawings.

Figure 1:
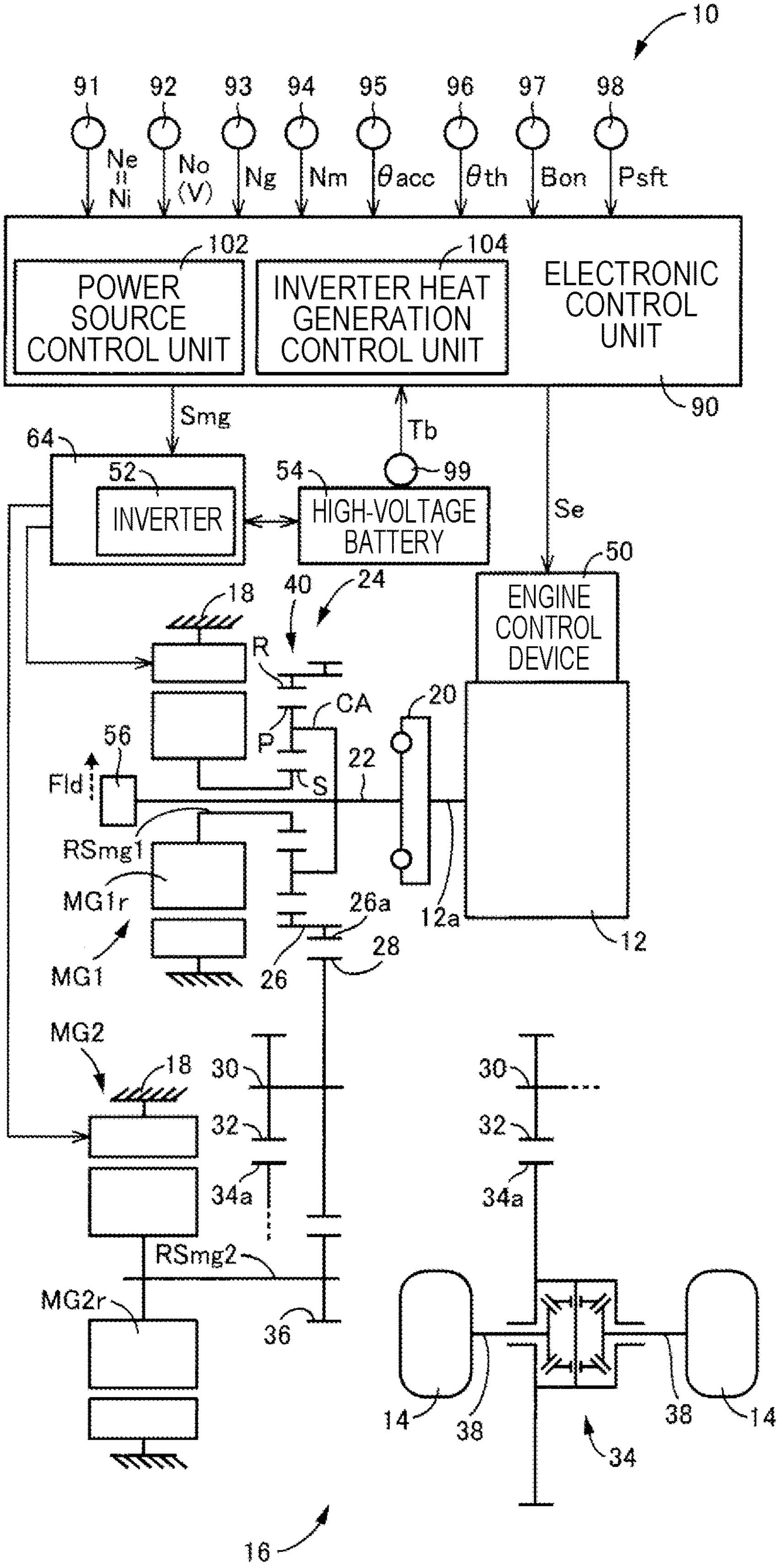
FIG. 1 is a diagram schematically illustrating a configuration of a vehicle to which the invention is applied and illustrating a principal part of a control function and a control system for various types of control in the vehicle.

In FIG. 1, a vehicle 10 includes an engine 12, a first electric motor MG1, and a second electric motor MG2. The vehicle 10 further includes driving wheels 14 and a power transmission device 16 that is provided in a power transmission path between the engine 12 and the driving wheels 14. The vehicle 10 according to the embodiment is a motor-driven vehicle, particularly, a hybrid electric vehicle, including the engine 12 and the second electric motor MG2 serving as power sources.

The engine 12 is a known internal combustion engine. In the engine 12, an engine torque Te which is a torque of the engine 12 is controlled by controlling an engine control device 50 provided in the vehicle 10 using an electronic control unit 90 which will be described later.

Each of the first electric motor MG1 and the second electric motor MG2 is an electric rotary machine, that is, a so-called motor generator. The first electric motor MG1 and the second electric motor MG2 are connected to a high-voltage battery 54 provided in the vehicle 10 via an inverter 52 provided in the vehicle 10. In the first electric motor MG1 and the second electric motor MG2, an MG1 torque Tg which is a torque of the first electric motor MG1 and an MG2 torque Tm which is a torque of the second electric motor MG2 are controlled by controlling the inverter 52 using the electronic control unit 90 which will be described later. The first electric motor MG1 and the second electric motor MG2 are provided in a case 18 attached to a vehicle body.

The power transmission device 16 includes a damper 20, an input shaft 22, a speed change unit 24, a combined gear 26, a driven gear 28, a driven shaft 30, a final gear 32, a differential gear 34, and a reduction gear 36 in the case 18. The power transmission device 16 further includes a rotor shaft RSmg1 integrally connected to a rotor MG1*r* of the first electric motor MG1 and a rotor shaft RSmg2 integrally connected to a rotor MG2*r* of the second electric motor MG2 in the case 18. The power transmission device 16 further includes a pair of drive shafts 38 connected to the differential gear 34.

The input shaft 22 serves as an input rotary member of the speed change unit 24 and is connected to a crankshaft 12*a* of the engine 12 via the damper 20 or the like. Power from the engine 12 is input to the input shaft 22. The speed change unit 24 is connected to the input shaft 22. The combined gear 26 is a rotary member on an output side of the speed change unit 24. A drive gear 26*a* is formed in a part of an outer circumferential surface of the combined gear 26. The drive gear 26*a* is an output rotary member of the speed change unit 24. The driven gear 28 engages with the drive gear 26*a*. The driven shaft 30 fixes the driven gear 28 and the final gear 32 such that they cannot rotate relatively. The final gear 32 has a diameter smaller than that of the driven gear 28 and engages with a differential ring gear 34*a* of the differential gear 34. The reduction gear 36 has a diameter smaller than that of the driven gear 28 and engages with the driven gear 28. The rotor shaft RSmg2 is connected to the reduction gear 36, and the second electric motor MG2 is connected thereto in a power-transferable manner.

The power transmission device 16 transmits power output from the engine 12 to the driven gear 28 via the speed change unit 24. The power transmission device 16 transmits power output from the second electric motor MG2 to the driven gear 28 via the reduction gear 36. The power transmission device 16 transmits power transmitted to the driven gear 28 to the driving wheels 14 sequentially via the driven shaft 30, the final gear 32, the differential gear 34, the drive shaft 38, and the like.

The speed change unit 24 includes a first electric motor MG1, a rotor shaft RSmg1, and a planetary gear device 40. The planetary gear device 40 is a planetary gear device including a sun gear S, a carrier CA, a ring gear R, and a pinion P. The rotor shaft RSmg1 of the first electric motor MG1 is connected to the sun gear S in a power-transferable manner. The engine 12 is connected to the carrier CA via the input shaft 22 or the like in a power-transferable manner. The ring gear R is formed in a part of an inner circumferential surface of the combined gear 26 and is integrally connected to the drive gear 26*a*. The pinion P is supported by the carrier CA such that it can spin and revolve. The ring gear R engages with the sun gear S via the pinion P.

Power of the engine 12 is input to the planetary gear device 40 via the input shaft 22. The first electric motor MG1 is an electric motor connected to the planetary gear device 40 in a power-transferable manner. The planetary gear device 40 is a power split mechanism that mechanically splits the power of the engine 12 input to the carrier CA to the first electric motor MG1 and the drive gear 26*a*. The speed change unit 24 is an electrical speed change mechanism which is controlled by the first electric motor MG1.

The vehicle 10 further includes a mechanical oil pump (hereinafter referred to as MOP) 56. The MOP 56 is connected to the input shaft 22 in a power-transferable manner. The MOP 56 is rotationally driven by the engine 12 to supply oil Fld which is used for lubrication or cooling of constituent parts of the power transmission device 16.

Figure 2:
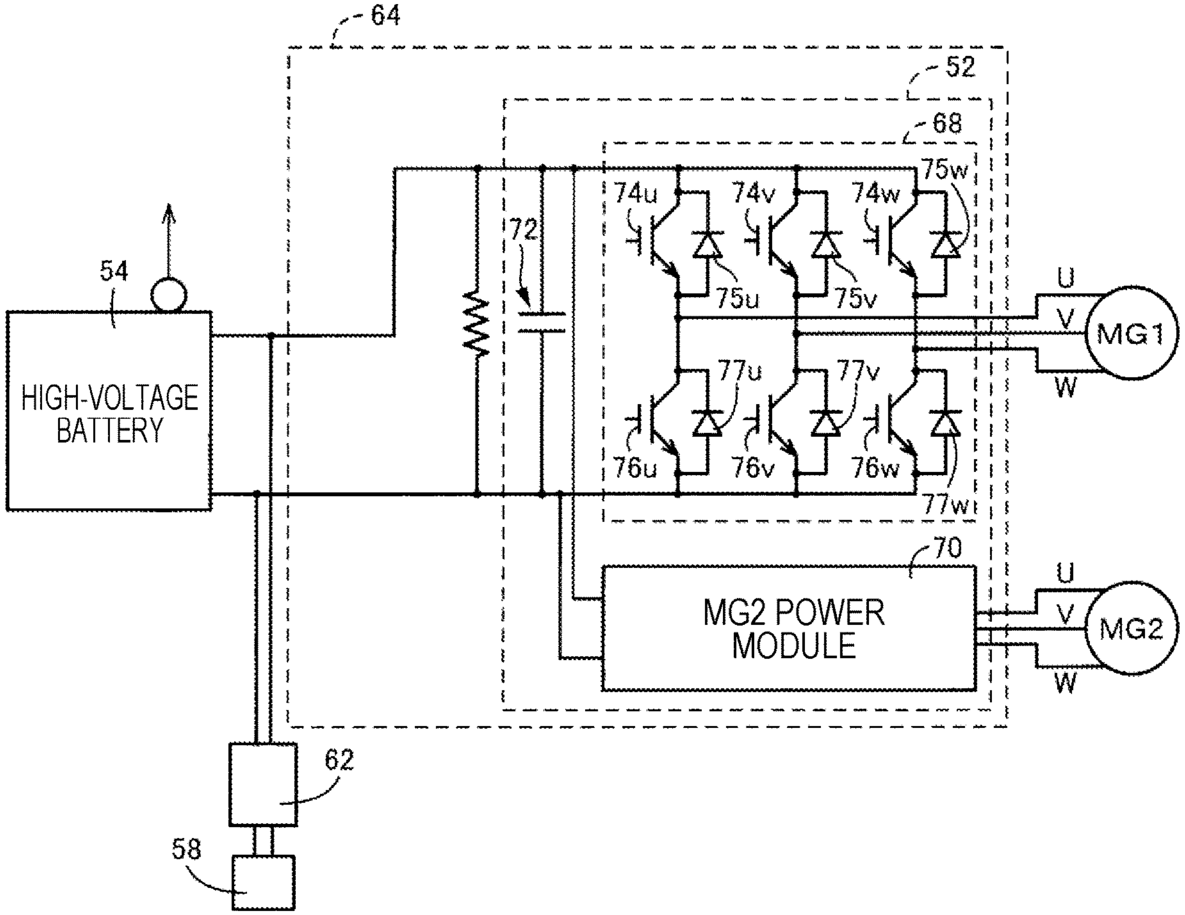
FIG. 2 is a diagram specifically illustrating a storage battery and a power control circuit for controlling driving of an electric motor provided in the vehicle illustrated in FIG. 1.

FIG. 2 is a diagram illustrating an example of an electrical configuration of an electric power control circuit 64 including the inverter 52 or the like which is provided in the vehicle 10.

The high-voltage battery 54 serving as a storage battery is a DC power supply which is chargeable/dischargeable and is, for example, a secondary battery such as a nickel-hydride secondary battery or a lithium-ion battery.

Stored electric power is supplied from the high-voltage battery 54 to the first electric motor MG1 or the second electric motor MG2 via the electric power control circuit 64. Electric power based on power generation control of the first electric motor MG1 or electric power based on regeneration control of the second electric motor MG2 is supplied to the high-voltage battery 54 via the electric power control circuit 64. The high-voltage battery 54 is a vehicle-driving battery.

A DCDC converter 62 is connected to the high-voltage battery 54. The DCDC converter 62 serves as a charging device that steps down a voltage of the high-voltage battery 54 to a voltage equivalent to that of an auxiliary-machine battery 58 and charges the auxiliary-machine battery 58. The auxiliary-machine battery 58 supplies electric power for operating auxiliary machines provided in the vehicle 10. The auxiliary-machine battery 58 supplies electric power for operating the electronic control unit 90 which will be described later or the like.

The electric power control circuit 64 includes an inverter 52 that controls electric power which is transmitted between the high-voltage battery 54 and the first electric motor MG1 and the second electric motor MG2. Since the voltage of the high-voltage battery 54 is high, the electric power control circuit 64 according to this embodiment does not include a step-up converter that steps up the voltage of the high-voltage battery 54 and supplies the stepped-up voltage to the inverter 52, and steps-down a voltage converted to a DC voltage by the inverter 52 and supplies the stepped-down voltage to the high-voltage battery 54.

The inverter 52 includes an MG1 power module 68, an MG2 power module 70, and a capacitor 72. The MG1 power module 68 includes six transistors 74*u*, 74*v*, 74*w*, 76*u*, 76*v*, and 76*w* and six diodes 75*u*, 75*v*, 75*w*, 77*u*, 77*v*, and 77*w* connected in anti-parallel to the transistors 74*u*, 74*v*, 74*w*, 76*u*, 76*v*, and 76*w*. In this embodiment, when they are not particularly distinguished, the transistors 74*u*, 74*v*, and 74*w* are referred to as transistors 74, and the transistors 76*u*, 76*v*, and 76*w* are referred to as transistors 76. The MG1 power module 68 constitutes a three-phase bridge circuit of a U phase, a V phase, and a W phase using the transistors 74 and 76 and the like. The transistors 74 and 76 serve as switching elements and convert a direct current to a three-phase alternating current by driving turn-on/off thereof. The transistors 74 constitute an upper arm in the transistors 74 and 76. The transistors 76 constitute a lower arm in the transistors 74 and 76. The MG2 power module 70 has the same configuration as the MG1 power module 68 and thus description of the MG2 power module 70 will be omitted. Each of the first electric motor MG1 and the second electric motor MG2 is a three-phase AC synchronous electric motor that is driven by the inverter 52 including a plurality of switching elements.

The inverter 52 converts a direct current from the high-voltage battery 54 to an AC current for driving the first electric motor MG1 and the second electric motor MG2. The inverter 52 converts an alternating current generated by the first electric motor MG1 using the power of the engine 12 and an alternating current generated by the second electric motor MG2 using a regenerative brake to direct currents and supplies the direct currents to the high-voltage battery 54. The inverter 52 supplies the alternating current generated by the first electric motor MG1 as electric power for driving the second electric motor MG2 according to a travel state.

Figure 3:
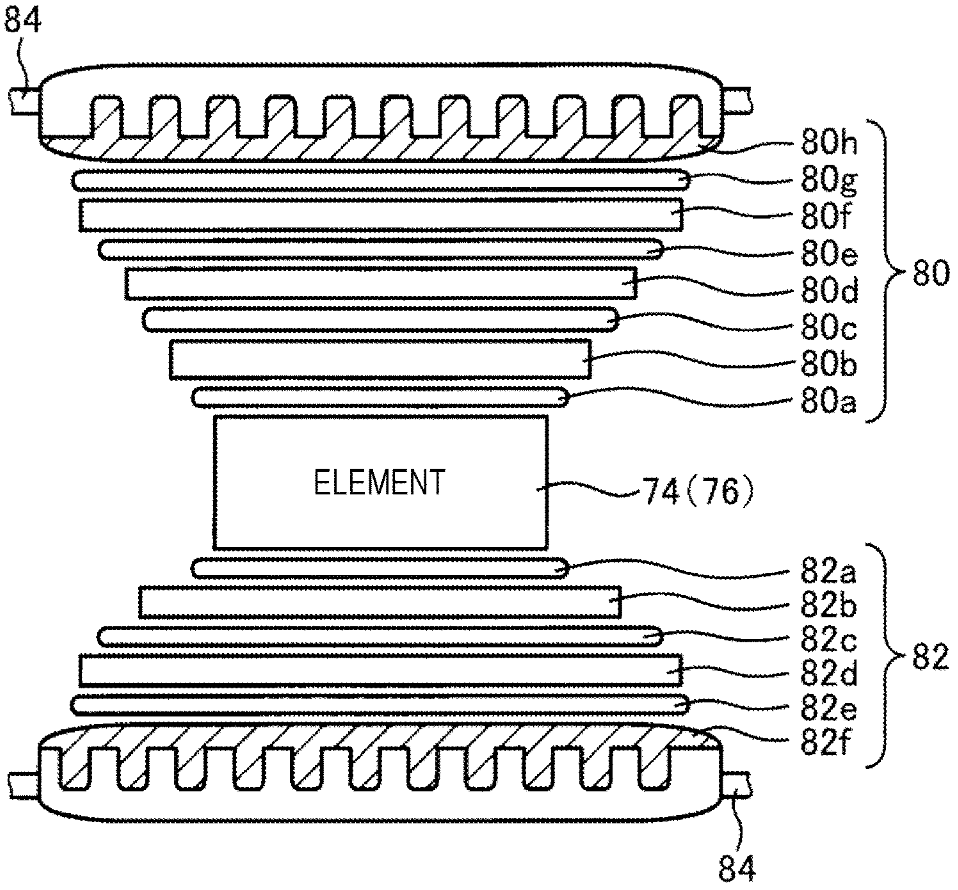
FIG. 3 is a diagram schematically illustrating a refrigerant circulation circuit that circulates a refrigerant to cool a storage battery and an inverter and that is provided in the vehicle illustrated in FIG. 1.

FIG. 3 illustrates a sectional structure of the transistors 74 and 76 constituted as a semiconductor chip of Si, GaN, or the like and serving as the switching elements. In FIG. 3, the transistors 74 and 76 are interposed between an emitter-side path 80 and a collector-side path 82. The emitter-side path 80 includes an element upper solder 80*a*, a copper block 80*b*, a CB upper solder 80*c*, a heat spreader 80*d*, a first upper grease layer 80*e*, a ceramic plate 80*f*, a second upper grease layer 80*g*, and an upper cooler fin 80*h* which are sequentially stacked on the transistors 74 and 76. The collector-side path 82 includes an element lower solder 82*a*, a heat spreader 82*b*, a first lower grease layer 82*c*, a ceramic plate 82*d*, a second lower grease layer 82*e*, and a lower cooler fin 82*f* which are sequentially stacked under the transistors 74 and 76. The first upper grease layer 80*e*, the second upper grease layer 80*g*, the first lower grease layer 82*c*, and the second lower grease layer 82*e* which are inserted into the transistors 74 and 76 are expanded due to self-heating of the transistors 74 and 76 and extruded to the outside of the transistors 74 and 76, and are not returned to the inside of the transistors 74 and 76 when the self-heating of the transistors 74 and 76 converges. The number of repetitions of heating and heat dissipation of the switching elements affects (contributes to) a deterioration mode of the inverter which is called grease-missing deterioration. Accordingly, it is preferable to decrease the number of repetitions of heating and heat dissipation of the switching elements.

Figure 4:
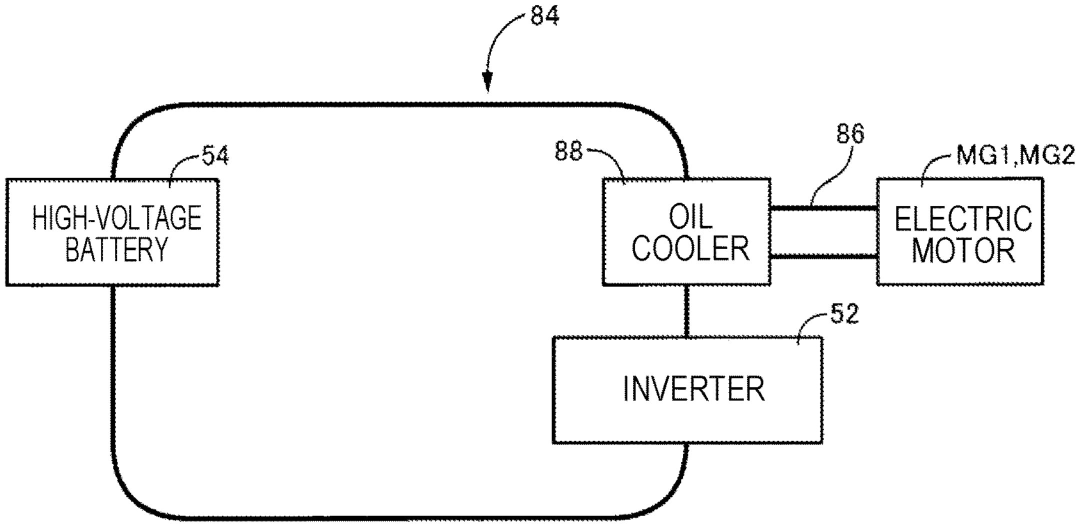
FIG. 4 is a diagram schematically illustrating a configuration of an inverter illustrated in FIG. 2.

As illustrated in FIG. 4, the vehicle 10 is provided with a cooling circuit 84 which is a closed circuit for cooling the high-voltage battery 54 which is a storage battery and the inverter 52 by circulating a refrigerant using a water pump which is not illustrated with water used as the refrigerant. The cooling circuit 84 includes an oil cooler 88 configured to perform exchange of heat between oil (a refrigerant) circulating in an electric motor cooling circuit 86 with an oil pump (not illustrated) to cool the first electric motor MG1 and the second electric motor MG2 and water in the cooling circuit 84. The cooling circuit 84 includes a radiator as needed.

Referring back to FIG. 1, the vehicle 10 includes an electronic control unit 90 which is a controller including a control device for the vehicle 10 associated with control of the engine 12, the electric motor, and the like. The electronic control unit 90 includes, for example, a so-called micro-computer including a CPU, a RAM, a ROM, and an input/output interface. The electronic control unit 90 performs various types of control of the vehicle 10 by causing the CPU to perform signal processing in accordance with a program stored in advance in the ROM using a temporary storage function of the RAM.

Various signals (for example, an engine rotation speed Ne (=an input rotation speed Ni), an output rotation speed No corresponding to a vehicle speed V, an MG1 rotation speed Ng which is a rotation speed of the first electric motor MG1, an MG2 rotation speed Nm, which is a rotation speed of the second electric motor MG2, an accelerator operation amount θacc, a throttle opening θth, a brake-on signal Bon, a shift lever operation position Psft, and a temperature Tb of the high-voltage battery 54) based on detection values from various sensors (for example, an engine rotation speed sensor 91, an output rotation speed sensor 92, an MG1 rotation speed sensor 93, an MG2 rotation speed sensor 94, an accelerator operation amount sensor 95, a throttle opening sensor 96, a brake switch 97, a shift lever operation position detection switch 98, and a temperature sensor 99) provided in the vehicle 10 are supplied to the electronic control unit 90.

The electronic control unit 90 outputs various instruction signals (for example, an engine control instruction signal Se for controlling the engine 12 and an MG control instruction signal Smg for controlling the first electric motor MG1 and the second electric motor MG2) to various devices (for example, the engine control device 50 and the inverter 52) provided in the vehicle 10.

The electronic control unit 90 functionally includes a power source control unit 102 and a heat generation control unit 104 for realizing various types of control in the vehicle 10.

The power source control unit 102 has an engine control function of controlling the operation of the engine 12 and an electric motor control function of controlling the operation of the first electric motor MG1 and the second electric motor MG2 via the inverter 52.

The power source control unit 102 calculates a required drive quantity for the vehicle 10 from a driver, for example, by applying the accelerator operation amount θacc and the vehicle speed V to a required drive quantity map. The required drive quantity map is a relationship for calculating the required drive quantity which is acquired and stored by experiment or design in advance, that is, which is determined in advance. The required drive quantity is, for example, a drive torque Tr required for the vehicle 10, that is, a required drive torque Trdem [Nm] for the driving wheels 14. In other words, the required drive torque Trdem is a required drive power Prdem [W] at the vehicle speed V at that time. A required drive force Frdem [N] for the driving wheels 14 or the like may be used as the required drive quantity.

The power source control unit 102 outputs an engine control instruction signal Se and an MG control instruction signal Smg to realize the required drive power Prdem, for example, in consideration of a transmission loss, an auxiliary-machine load, and the like. For example, the engine control instruction signal Se is an instruction value of an engine power Pe which is the power of the engine 12 for outputting the engine torque Te at the engine rotation speed Ne at that time in consideration of an engine-optimal fuel-efficiency point or the like. The MG control instruction signal Smg is an instruction value of electric power Wg generated by the first electric motor MG1 outputting an MG1 torque Tg at the MG1 rotation speed Ng at the time of outputting an instruction as a reaction torque of the engine torque Te. The MG control instruction signal Smg is an instruction value of electric power Wm consumed in the second electric motor MG2 outputting an MG2 torque Tm at the MG2 rotation speed Nm at the time of outputting an instruction of the generated electric power Wg. The engine-optimal fuel-efficiency point is predetermined, for example, as an engine operating point at which total fuel efficiency in the vehicle 10 is the best, for example, in consideration of charging/discharging efficiency of the high-voltage battery 54 or transmission efficiency of the power transmission device 16 along with fuel efficiency of the engine 12 alone.

The power source control unit 102 sets a travel mode of the vehicle 10 to a BEV travel mode when the required drive power Prdem is in a BEV travel area which is less than a predetermined threshold value. On the other hand, the power source control unit 102 sets the travel mode of the vehicle 10 to an HEV travel mode when the required drive power Prdem is in an HEV travel area equal to or greater than the predetermined threshold value. On the other hand, when the required drive power Prdem is in the BEV travel area and the high-voltage battery 54 needs to be charged or the engine 12 or the like needs to warm up, the power source control unit 102 sets the HEV travel mode.

When a P range (a parking range) is selected as a shift range of the vehicle 10 and the temperature Tb of the high-voltage battery 54 is lower than a preset warmup-requirement determination temperature Td of the high-voltage battery 54, the heat generation control unit 104 causes at least one inverter 52 to emit heat by passing a constant inverter current (a direct current) Iinv1 for warmup through the at least one inverter 52 for a predetermined time and transfers heat generated from the at least one inverter 52 to the high-voltage battery (storage battery) 54 via the cooling circuit 84 to cause the high-voltage battery 54 to warm up. The warmup-requirement determination temperature Td is set to a temperature at which a chargeable/dischargeable electric power range of the high-voltage battery (storage battery) 54 is narrowed and control of the vehicle 10 is hindered, for example, 0° C. The constant inverter current (a direct current) Iinv1 flows through, for example, at least one of the transistors 74*u*, 74*v*, and 74*w*, at least one coil of the first electric motor MG1, and at least one of the transistors 76*u*, 76*v*, and 76*w*.

Figure 5:
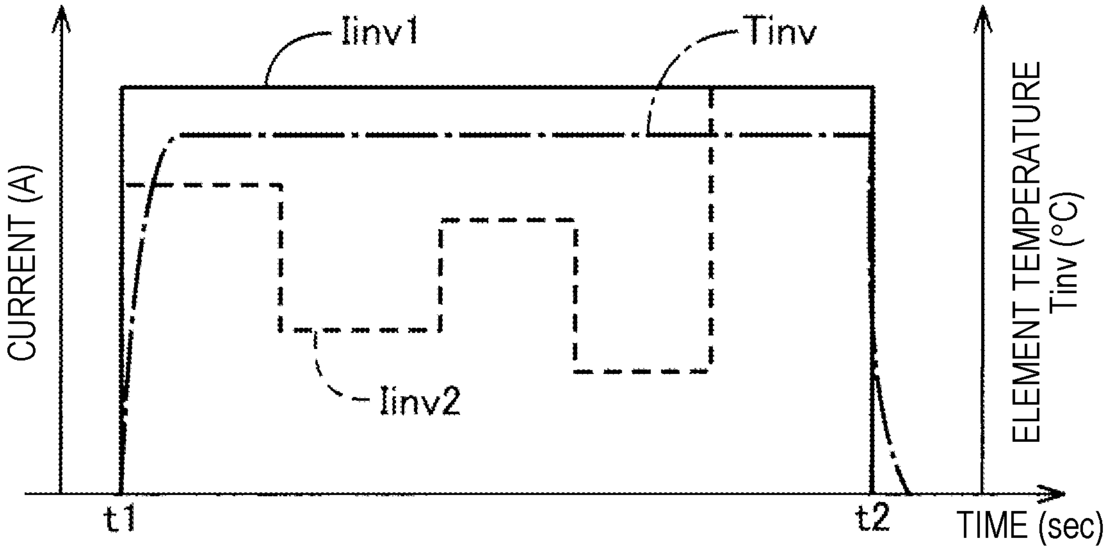
FIG. 5 is a timing chart illustrating operations which are performed by a heat generation control unit illustrated in FIG. 1.

FIG. 5 illustrates a current for causing the heat generation control unit 104 to operate one inverter 52. In FIG. 5, a constant inverter current Iinv indicated by a solid line is, for example, 200 A, and a predetermined time t1-t2 is, for example, 30 seconds. In FIG. 5, a one-dot chain line indicates the temperature Tinv of the inverter 52, and a dotted line indicates an inverter current Iinv2 in a comparative example illustrated in FIG. 6. The constant inverter current Iinv1 substantially includes the inverter current Iinv2 in the comparative example varying in a pulse shape every 6 seconds and is greater than an integrated value (an area value) of the inverter current Iinv2 in the comparative example.

Figure 6:
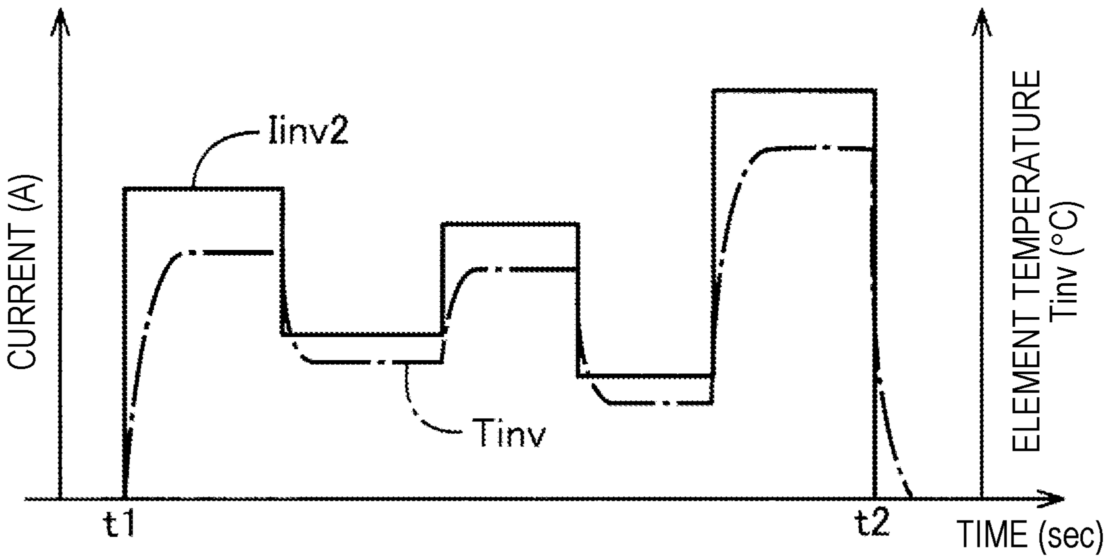
FIG. 6 is a timing chart illustrating operations which are performed by a heat generation control unit according to a comparative example.

FIG. 6 is a diagram illustrating the operation of heat generation control in the comparative example of the heat generation control unit 104 and illustrating the same two-dimensional coordinates as in FIG. 5. The heat generation control unit 104 in this case sequentially calculates an amount of discharged heat required for warmup of the high-voltage battery (storage battery) 54 based on (in response to) the change in temperature Tb of the high-voltage battery 54 with a period shorter than that in FIG. 5, for example, a period of 6 seconds, sequentially calculates the inverter current Iinv2 for generating the calculated heat, and operates at least one inverter 52 with the inverter current Iinv2. A solid line in FIG. 6 indicates the inverter current Iinv2 varying every predetermined time of, for example, 6 seconds due to an influence of wind or the like, and a one-dot chain line indicates the temperature Tinv of the inverter 52.

Figure 7:
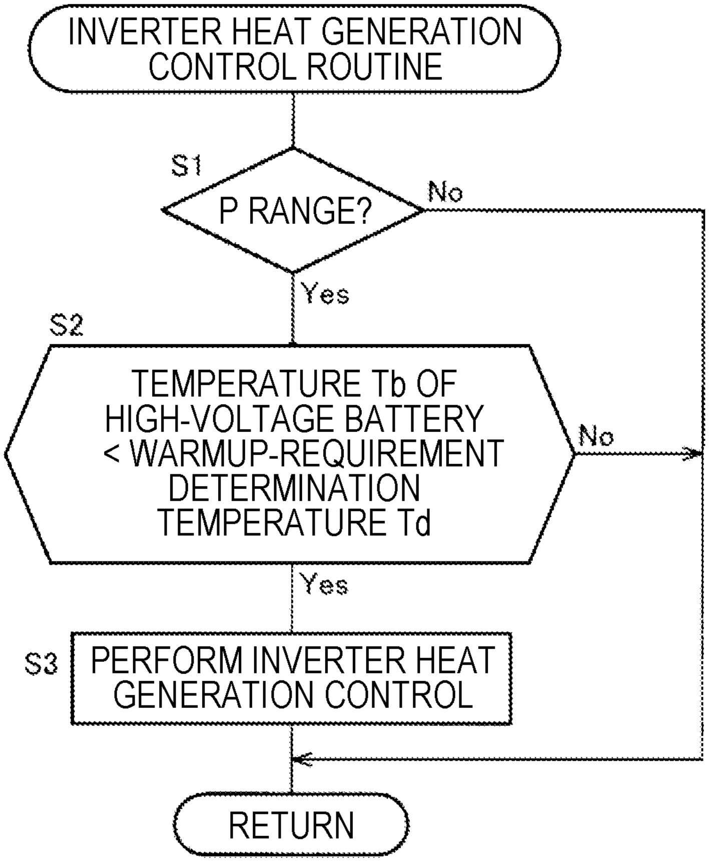
FIG. 7 is a flowchart illustrating a control operation which is performed by the heat generation control unit illustrated in FIG. 1.

FIG. 7 is a flowchart illustrating a principal part of the control operation which is performed by the electronic control unit 90. In Step S1 (Step is omitted hereinafter) of FIG. 7, it is determined whether the P range in which movement of the vehicle 10 is prohibited by a parking lock mechanism of the vehicle 10 has been selected in the shift range of the vehicle 10. When the determination result of S1 is negative, this routine ends. On the other hand, when the determination result of S1 is positive, it is determined in S2 whether the temperature Tb of the high-voltage battery 54 is lower than the preset warmup-requirement determination temperature Td of the high-voltage battery 54, for example, 0° C. When the determination result of S2 is negative, this routine ends. On the other hand, when the determination result of S2 is positive, inverter heat generation control is performed for a predetermined time in S3 corresponding to the heat generation control unit 104. At least one inverter 52 is caused to emit heat by passing the constant inverter current Iinv1 for warmup through the at least one inverter 52 for a predetermined time, and the heat emitted from the at least one inverter 52 is transferred to the high-voltage battery (storage battery) 54 via the cooling circuit 84 to warm the high-voltage battery 54.

As described above, with the electronic control unit 90 according to this embodiment, the heat generation control unit 104 causes at least one inverter 52 to emit heat by passing the constant current Iinv1 through the inverter for the predetermined time, and the heat emitted from the at least one inverter 52 warms the high-voltage battery (storage battery) 54 via the cooling circuit 84. Accordingly, control for warming the high-voltage battery (storage battery) 54 is simply performed by passing the constant current Iinv1 through the inverter 52 for the predetermined time. This inverter heat generation control can also be applied to a vehicle 10 not including a step-up converter. Since the heat generation control unit 104 causes the inverter 52 to emit heat by passing the constant inverter current (a direct current) Iinv1 through the inverter 52 for the predetermined time, heating and heat dissipation of the inverter 52 is not repeated and the deterioration mode of the inverter called grease-missing deterioration is curbed.

With the electronic control unit 90 according to this embodiment, the inverter heat generation control performed by the heat generation control unit 104 is performed when the P range has been selected as the shift range of the vehicle 10. In the P range, since movement of the vehicle is prohibited by the parking lock mechanism of the vehicle 10, there is an advantage that the inverter heat generation control does not affect behavior of the vehicle 10.

With the electronic control unit 90 according to this embodiment, the inverter heat generation control performed by the heat generation control unit 104 is performed when the temperature Tb of the high-voltage battery (storage battery) 54 is lower than the preset warmup-requirement determination temperature Td of the high-voltage battery (storage battery) 54. Accordingly, warmup of the high-voltage battery (storage battery) 54 is performed at a low temperature at which chargeable/dischargeable electric power range is relatively narrow, and the chargeable/dischargeable electric power range of the high-voltage battery (storage battery) 54 is rapidly broadened.

With the electronic control unit 90 according to this embodiment, the constant current Iinv1 in the inverter heat generation control performed by the heat generation control unit 104 has values including a current Iinv2 which is varied to generate an amount of discharged heat required for increasing the temperature Tb of the high-voltage battery (storage battery) 54 which is calculated based on the temperature Tb of the high-voltage battery (storage battery) 54 in comparison with a comparative example in which the current Iinv2 which is varied to generate the amount of discharged heat is used. Accordingly, control for warming the high-voltage battery (storage battery) 54 is simplified.

With the electronic control unit 90 according to this embodiment, the refrigerant of the cooling circuit 84 is water, and the cooling circuit 84 includes the oil cooler 88 that performs exchange of heat between the oil in the electric motor cooling circuit 86 cooling the first electric motor MG1 and the second electric motor MG2 and the water in the cooling circuit 84. Accordingly, when the heat generation control unit 104 causes the coils of the first electric motor MG1 and the second electric motor MG2 to emit heat by passing the constant current Iinv1 through the inverter 52 for the predetermined time, the heat generated in the first electric motor MG1 and the second electric motor MG2 is also transferred to the high-voltage battery (storage battery) 54 via the oil cooler 88 and the cooling circuit 84 and contributes to warmup of the high-voltage battery (storage battery) 54. As a result, it is possible to further promote warmup of the high-voltage battery (storage battery) 54.

While an embodiment of the invention has been described above in detail with reference to the drawings, the invention may be applied to other aspects.

For example, the vehicle 10 according to the embodiment does not include a step-up converter between the high-voltage battery (storage battery) 54 and the inverter 52, but may include a step-up converter between the high-voltage battery (storage battery) 54 and the inverter 52.

The vehicle 10 according to the embodiment is a hybrid electric vehicle including the engine 12, the first electric motor MG1, and the second electric motor MG2 as power sources, but may be a motor-driven vehicle including an electric motor as a power source.

In the vehicle 10 according to the embodiment, the heat generation control unit 104 causes the constant inverter current (direct current) Iinv1 to pass through the inverter 52 for a predetermined time such that the inverter 52 generates heat for warming the high-voltage battery 54 as illustrated in FIG. 5. The constant inverter current (direct current) Iinv1 or an instruction value of the inverter current (direct current) Iinv1 does not have to be strictly constant, and the amplitude or period thereof may vary to an extent that the inverter 52 does not repeat heating and heat dissipation causing grease-missing deterioration in the inverter (switching elements) 52.

The aforementioned description is merely an embodiment, and the invention can be realized in aspects with various modifications and improvements based on knowledge of those skilled in the art.

What is claimed is:

1. A control device for a vehicular storage battery comprising:

an inverter configured to control a drive current supplied from a storage battery to an electric motor;

a cooling circuit configured to cool the storage battery and the inverter by circulating a refrigerant; and an inverter heat generation control unit configured to cause the inverter, which outputs AC power to the electric motor, to emit heat by passing a predetermined direct current through the inverter for a predetermined time and to warm up the storage battery with the heat emitted by the inverter and transferred to the cooling circuit, wherein a value of the predetermined direct current is calculated every preset time to generate an amount of discharged heat required for warmup of the storage battery and is varied based on a change in a temperature of the storage battery.

2. The control device for a vehicular storage battery according to claim 1, wherein inverter heat generation control which is performed by the inverter heat generation control unit is performed when a P range is selected as a shift range of the vehicle.

3. The control device for a vehicular storage battery according to claim 1, wherein inverter heat generation control which is performed by the inverter heat generation control unit is performed when the temperature of the storage battery is lower than a preset warmup-requirement determination temperature of the storage battery.

4. The control device for a vehicular storage battery according to claim 1, wherein the refrigerant of the cooling circuit is water, and wherein the cooling circuit includes an oil cooler configured to perform exchange of heat between oil in an electric motor cooling circuit for cooling the electric motor and water in the cooling circuit.

5. The control device for a vehicular storage battery according to claim 1, wherein the inverter is separate and distinct from a converter that converts DC input power from the storage battery and outputs a stepped-up DC power to the inverter.

6. The control device for a vehicular storage battery according to claim 1, wherein DC power from the storage battery is directly input to the inverter without a converter between the storage battery and the inverter, and the inverter outputs AC power to the electric motor.

7. The control device for a vehicular storage battery according to claim 1, wherein the predetermined direct current is a constant current.

8. The control device for a vehicular storage battery according to claim 1, wherein the preset time is a shorter time period than the predetermined time.

* * * * *